(Model.)
W. McB. SHEESLEY.
Machine for Cutting and Drilling Rails.
No. 238,976. Patented March 15, 1881.
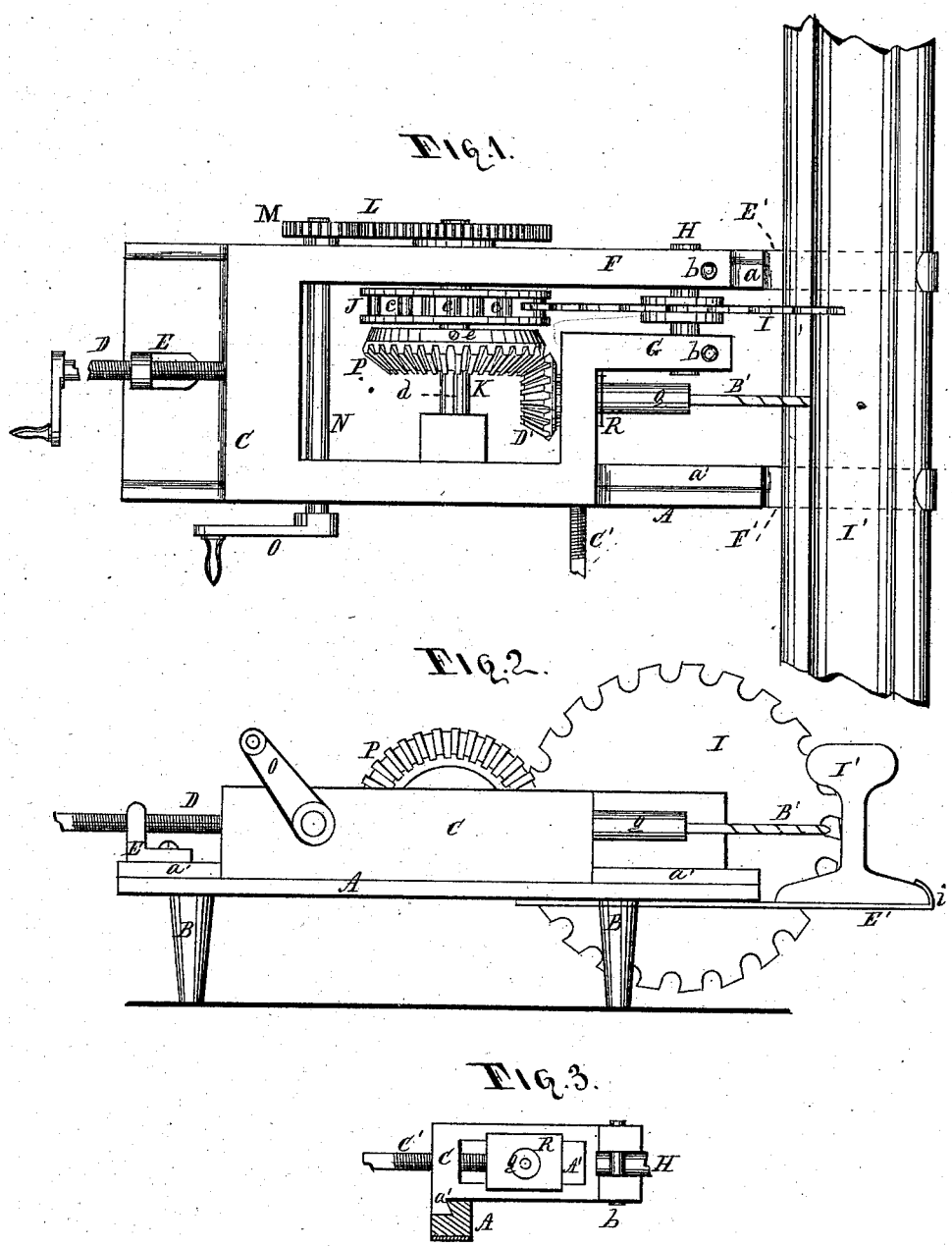

UNITED STATES PATENT OFFICE.

WILLIAM McB. SHEESLEY, OF CLEVELAND, OHIO.

MACHINE FOR CUTTING AND DRILLING RAILS.

SPECIFICATION forming part of Letters Patent No. 238,976, dated March 15, 1881.

Application filed November 4, 1880. (Model.)

*To all whom it may concern:*

Be it known that I, WM. McBAY SHEESLEY, of Cleveland, in the county of Cuyahoga and State of Ohio, have invented new and useful Improvements in Machines for Cutting Railway-Rails and Boring Holes Therein, of which the following is a full and complete description.

The object of this invention is a machine for simultaneously cutting off railway-rails and boring holes therein for the fish-plate bolts while the said rails are in place on the track, thereby saving the time, labor, and expense of taking up the rails for that purpose, which must be done for cutting and drilling in the ordinary way.

For illustrating this invention, and as a part of the specification thereof, the accompanying drawings will be referred to, of which—

Figure 1 is a plan view of the machine. Fig. 2 is a side elevation. Fig. 3 is a detached section.

Like letters of reference denote like parts in the views presented.

In the drawings alluded to, A represents a frame or bed of the machine, supported upon legs B. On said frame is arranged a sliding carriage, C, secured to the frame by dovetail ways *a a'*, Fig. 1, also shown in Fig. 3. On said ways the carriage is caused to slide reciprocally by means of a feed-screw, D, working in a nut, E, the end of the screw being loosely attached to the carriage in any suitable way. A rack and pinion may be used for moving the carriage instead of a screw. A screw, however, is preferred.

In the arms F and G of the carriage is journaled a shaft, H, on which is secured a milling tool or cutter, I. The space between the teeth of the cutter is somewhat deep and rounded, adapted to receive the bars or cogs of the lantern-wheel J, for revolving the cutter. Said wheel J is mounted on the shaft K, and has its bearings in the sides of the carriage.

On one end of the shaft K is secured a cogwheel, L, that is made to engage a pinion, M, on the shaft N, which latter also is journaled in the carriage, and is operated by the crank O, and thus made to rotate the cutter I, above described.

On the shaft K is loosely fitted a bevel-wheel, P, which is prevented from revolving thereon by a feather, *d*, and is secured against lateral movement and to the desired adjustment on the shaft by a set-screw, *e*.

Q is a mandrel for holding the drill B'. Said mandrel is journaled in a movable box, R, fitted in an opening, A', in the end of the carriage. The said box is moved laterally by a screw, C', provided with a hand-wheel or crank for that purpose. The mandrel and drill are revolved by a bevel-pinion, D', made to engage a bevel-wheel, P, above alluded to, substantially as shown in the drawings.

To the under side of the frame A, at the front end, are attached two clamping-arms, E' and F', the extreme ends of these arms being turned upward, forming hook *i*, as seen in Fig. 2.

In repairing railway-tracks it often becomes necessary, in relaying the rails, to cut off the rails, as they may be too long for the place in which they are to be laid, or are so battered as to require being cut off. For this purpose the defective rail is usually taken up and the cutting done with a chisel. New holes are then required to adapt the cut rail to the fish-plate. This taking up of the rails for the purpose specified is attended with much labor and expense, to avoid which the above-described machine is used. Thus the machine is placed on the ground by the side of the rail to be cut, and the clamping-arms E' and F' are passed beneath the track, the hook extending beyond the rail and engaging with its flange. The machine is then drawn back so that the hooks of the arms may catch upon the edge of the foot of the rail, as seen in Fig. 2, in which I represents the rail.

The position of the machine in respect to the rail when applied thereto will be seen in Fig. 1, which represents the rail as partially cut into by the milling-tool or cutter I, the cutter being fed to the rail by the screw D moving the carriage forward toward the rail. At the same time that the rail is being cut the new hole for the fish-plate bolt is also being bored, the drill having been previously adjusted to the place where the hole should be by means of the adjusting-screw C'.

The wheel P may be moved on the shaft, the set-screw *e* being first loosened, to engage the pinion D' for operating the drill.

From the above it will be seen that the operations of cutting the rail and of drilling the hole for the fish-plate bolt may be done at the same time. The forward movement of the carriage feeds the cutter and the drill to the rail simultaneously.

It may not always be required to drill a hole in the rail, in which event the drill can be detached from the mandrel and the cutting be done without drilling, and it may be only necessary to drill a hole, cutting being unnecessary. To this end the milling-tool can be removed by withdrawing the pins $b$, which will allow said tool and shaft to be taken out from the frame, leaving the drill free to be used independently of the milling-tool.

From the above it will be obvious that in repairing the rails of railway-tracks, when said rails require to be cut and holes to be bored therein, such work can be done without taking up the rails for that purpose, which taking up is attended with more labor, loss of time, and expense than are required for cutting and drilling the rail by the machine specified.

What I claim as my invention, and desire to secure by Letters Patent, is—

In machines for cutting off railway-rails, the combination of a milling-tool or cutter, driving-wheel J, and power-gearing, adapted to each other as described, and arranged in a sliding carriage, C, mounted upon a frame or stand, said carriage being actuated by a screw, D, for feeding the milling-tool to the rail, substantially as and for the purpose specified.

In testimony whereof I affix my signature in presence of two witnesses.

WILLIAM McBAY SHEESLEY.

Witnesses:
J. H. BURRIDGE,
PAUL SCHNEIDER.